Figure 1:
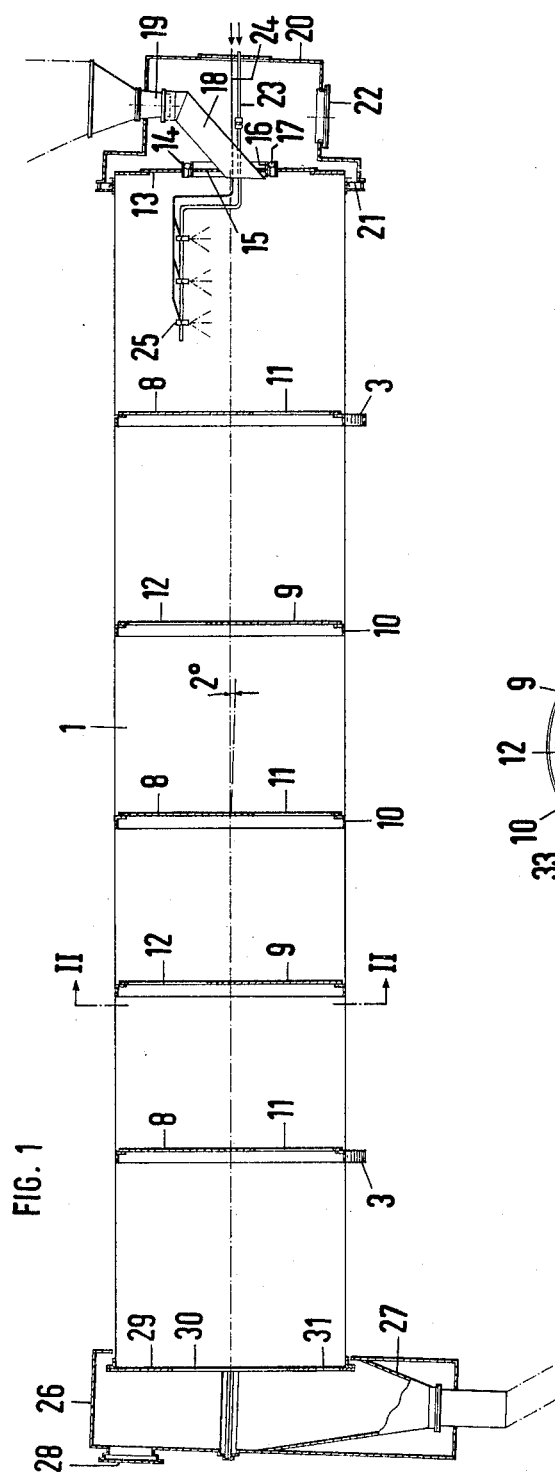

United States Patent [19]

Van Hijfte et al.

[11] 4,241,692
[45] Dec. 30, 1980

[54] COATING DRUM

[75] Inventors: Willy H. P. Van Hijfte, Assenede; Rafaël A. J. Goethals, Ertvelde, both of Belgium

[73] Assignee: Compagnie Neerlandaise de l'Azote, Brussels, Belgium

[21] Appl. No.: 898,330

[22] Filed: Apr. 20, 1978

[30] Foreign Application Priority Data

Apr. 28, 1977 [NL] Netherlands ................ 7704687

[51] Int. Cl.³ .................................... B05B 13/00
[52] U.S. Cl. ............................ 118/303; 427/212; 427/220; 427/215; 118/418
[58] Field of Search ............... 118/303, 418; 264/117; 366/58, 228, 235; 23/314; 427/212, 220, 215

[56] References Cited

U.S. PATENT DOCUMENTS

| 513,925 | 1/1894 | Harton | 366/235 |
|---|---|---|---|
| 1,296,445 | 3/1919 | Webster | 366/58 |
| 2,127,137 | 8/1938 | Price | 366/235 |
| 2,213,056 | 8/1940 | Skoog | 23/314 |
| 2,309,970 | 2/1943 | McKinney | 23/314 |
| 3,588,052 | 6/1971 | Scholtz | 366/228 |

FOREIGN PATENT DOCUMENTS 1033727 of 1953 France ..................... 23/314

Primary Examiner—Sam Silverberg
Attorney, Agent, or Firm—Scully, Scott, Murphy & Presser

[57] ABSTRACT

An apparatus for coating pellets, such as prills, granules and the like, with a liquid coating agent, which comprises a cylindrical, obliquely disposed drum arranged for rotation about its longitudinal axis, said drum comprising means at or adjacent its higher end for the supply and input of pellets to be coated and for supplying and spraying or atomizing said liquid coating agent over the pellets introduced, and means at or adjacent its lower end for the output and discharge of coated product pellets, and further is provided with partitions arranged transversely to the axis of rotation and dividing the drum into compartments, each of said partitions having a passage opening located eccentrically relative to the axis of rotation and so that the passage openings in each pair of partitions defining a compartment are peripherally offset relatively to each other.

6 Claims, 2 Drawing Figures

U.S. Patent

Dec. 30, 1980

4,241,692

COATING DRUM

This invention relates to an apparatus for coating pellets, such as prills, granules and the like, with a liquid coating agent.

The coating of pellets with a relatively slight amount of a liquid coating agent, for example, in a proportion of 0.2–5 parts by weight of coating agent to 1000 parts by weight of pellets, so that the pellets are provided with a uniform, substantially continuous coating, and this on an industrial scale, for example, at a rate of up to 50,000 kg pellets per hour, has hitherto invariably proved difficult to achieve. Spraying the coating agent in finely-divided form on to the pellets on a conveyor belt, in a chute and/or in a conventional coating drum only seldom leads to acceptable results.

We have studied the coating process and the factors which play a role in it by means of coating drums made of plexiglass, in which pellets were sprayed with a liquid coating agent to which a colouring agent had been added. In the light of countless experiments it was found that a more uniform coating is produced throughout the entire surface of the pellets according as the pellets being sprayed with the coating agent are rolling more intensely. The rolling has been found to be necessary for spreading the coating agent over the surface of the pellets. Any measure tending to reduce rolling, for example, lifting the pellets with built-in blades, turned out to delay or prevent spreading the coating agent.

In a drum without built-in elements, the extent to which the pellets are rolling depends greatly on the rate of rotation and the degree of filling. At high rates of rotation, the drum contents slide to and fro as one mass, and at low speeds, the path over which the pellets are rolling is short, and besides when the degree of filling is less than 25% the pellets also roll to an insufficient extent. The degree of filling and the rotary speed should be accurately attuned to each other, which gives rise to problems in the event of variation in the supply of the pellets.

In a drum provided internally with blades placed in the longitudinal direction, the pellets are lifted by the blades, whereafter they fall down from a certain height. In such a drum the pellets hardly have an opportunity of rolling, as they are lying still while being lifted, and are also unable to roll during their fall.

In a drum provided internally with inclined cross-partitions with a central throughflow aperture, both the throughflow and the rolling effect are poor.

In a V-shaped drum with an eccentrically placed shaft, on the other hand, the rolling effect is very good. Such a drum, however, can only be used batchwise for relatively small batches and cannot be integrated in a continuous conditioning line.

One important object of the present invention is to provide an apparatus for coating pellets with a liquid coating agent, which causes intensive rolling of the pellets being sprayed with the coating agent, and thereby causes the formation of a uniform substantially continuous coating over the surface of the pellets.

According to the present invention, there is provided an apparatus for coating pellets, such as prills, granules and the like, with a liquid coating agent, which comprises a cylindrical, obliquely disposed drum arranged for rotation about its longitudinal axis, said drum comprising means at or adjacent its higher end for the supply and input of pellets to be coated and for supplying and spraying or atomizing said liquid coating agent over the pellets introduced, and means at or adjacent its lower end for the output and discharge of coated product pellets, said apparatus being characterized by partitions arranged transversely to the axis of rotation and dividing the drum into compartments, each of said partitions having a passage opening located eccentrically relative to the axis of rotation and so that the passage openings in each pair of partitions defining a compartment are peripherally offset relatively to each other.

In order that, after the supply of pellets has been stopped, the apparatus according to the invention may be emptied practically completely by continued rotation, it is preferable that the passage openings in the partitions are formed so as to adjoin the inner surface of the drum.

A further preferred feature is that the passage openings in two immediately succeeding partitions are peripherally off-set relatively to each other through approximately 180°, and another preferred feature is that the width of each passage opening in the radial direction relative to the axis of rotation is less than half the interior diameter of the drum.

For many applications it has been found beneficial in practice if all passage openings have substantially the same surface area, which surface area is preferably more than 2%, but less than 25% of the cross-sectional area of the drum. In certain cases, however, it may be desirable to affect, for example, the level or the residence time of the pellets in the drum or in certain compartments by varying the surface area of the passage openings. Thus, for example, the level of the pellets in the drum can be increased by selecting a smaller surface area for the opening in the last partition than for the other partitions.

The perpendicular distance between two immediately succeeding partitions is preferably no greater than the interior drum diameter.

The apparatus according to this invention during rotation causes a surprisingly intensive rolling of the pellets present within the drum owing to which the liquid coating agent which for example is sprayed or atomized on to the pellets in the first compartment of the drum, is spread into a uniform, substantially continuous coating on the surface of the pellets. During the rotation, the pellets traverse a helicoid path via the passage openings which are in their lowest position. The passage openings filled with pellets close the various compartments in groups of two during the major part of a revolution so that the sprayed or atomized coating agent being confined between the partitions, i.e. being unable to pass the passage openings filled with pellets, is practically forced to come into contact with the pellets. It is this feature which gives the apparatus according to the present invention the extremely important advantage that the liquid coating agent is practically completely utilized for coating the pellets, and at worst can escape the drum to the working space in minimum quantities only.

The rolling effect in the apparatus according to the invention turns out to be only little dependent on the degree of filling of the drum, and hence is hardly affected by variations in the supply of the pellets. A good rolling effect is obtained with a degree of filling as low as 12%. The average residence time of the pellets in the drum is of the order of 5–8 minutes.

The liquid coating agent is sprayed or atomized via one or more sprayers on to the surface of the rolling pellets, preferably at right angles to the direction of the top layer of the rolling pellets.

The apparatus according to the invention is very suitable for use in the process described in our co-pending patent application filed concurrently herewith and entitled "Ammonium nitrate containing fertilizer pellets having improved properties during storage and transportation, and a process of making same", which patent application is incorporated herein by reference.

One embodiment of the present invention will now be described, by way of example, with reference to the accompanying diagrammatic drawings.

Figure 2:
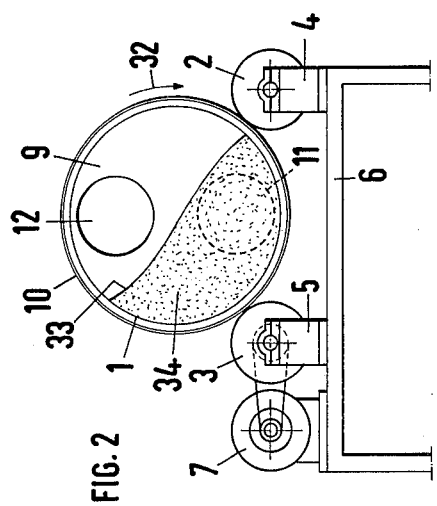

In said drawings,

FIG. 1 shows a longitudinal section of an apparatus according to the invention with the supporting apparatus being omitted; and FIG. 2 shows a cross-sectional view taken on the line II—II of FIG. 1.

Referring to the drawings, there is shown a cylindrical drum 1 supported on a pair of supporting wheels 2 on one side of the vertical median plane of the drum and on a pair of supporting wheels 3 on the other side of that plane.

Wheels 2 and 3 have their axles journalled in bearing stands 4 and 5 respectively, which are secured to a base 6. At least one of wheels 3 is driven by means of a drive motor 7, likewise mounted on base 6. In FIG. 1, base 6 and stands 4 have been omitted.

Drum 1 is divided into compartments by means of three partitions 8 and two partitions 9. Partitions 8 and 9 are connected with the drum wall through angles 10. Partitions 8 are provided with round passage openings 11 and partitions 9 with corresponding passage openings 12. In the peripheral direction of drum 1, openings 11 are offset relative to openings 12 through approximately 180° C.

At the supply end of drum 1, an end wall 13 is provided with a central aperture whose circumference is formed by a ring 14. Located concentrically within ring 14 is an auxiliary wall 15 having a circumferential ring 16. Roller members 17 are interposed between rings 14 and 16 to support wall 15 within ring 14. Auxiliary wall 15 is connected to a supply pipe 18 secured to the outlet 19 of the funnel of a supply bunker, from which the pellets to be coated are supplied. A box structure 20 encloses the supply end of drum 1 and is sealed against drum 1 by means of a resilient gasket 21. Located opposite the place of entry of outlet 19 is a manhole closed with cover 22. The means for supporting box structure 20 are not shown in the accompanying drawings.

Passing through box structure 20 and auxiliary wall 15, a supply line 23 for supplying liquid coating material and a compressed-air conduit 24 enter the drum for spraying or atomizing the coating agent through sprayers 25 above the pellets to be fed through supply pipe 18. Naturally it is also possible for the liquid coating agent to be hydraulically sprayed or atomized by means of a force pump, such as a diesel pump.

At its outlet, drum 1 is enclosed by a box structure 26, which is provided at its bottom with a discharge funnel 27 and at its upper end with a manhole closed with a cover 28. The end wall 29 of drum 1 located within box structure 26 has a central passage opening 30 and three smaller passage openings 31 spaced peripherally about it.

The axis of rotation of drum 1 is inclined downwardly from the input end of the drum through a small angle, for example, 2°, for transportation of the pellets introduced into the drum to its outlet end.

During the rotation of drum 1 in the sense indicated by arrow 32 in FIG. 2, the pellets introduced are carried upwards for some distance by the drum wall owing to friction, whereafter they roll down away from the wall. As a result the upper surface 33 of the mass of pellets 34 in the rotating drum acquires an oblique, slightly curved configuration, as indicated by line 33 in FIG. 2.

The inclined configuration of upper surface 33 partly depends on the degree of filling and the rate of rotation of the drum, and also on the form of the pellets and on the friction of the coated pellets with the drum wall and with each other. These factors can be so selected, taking into account the place and diameter of passage openings 11 and 12 in partitions 8 and 9, that for example passage openings 11 are at all times, or substantially at all times, filled with pellets when passage openings 12 are cleared by the pellets, and the other way round. As a consequence, during operation there is never a direct and unobstructed connection available to the sprayed or atomized coating agent from the input end to the output end of drum 1. Passage openings 11 and 12 need not be round for this effect to be achieved. The form of a sector of a circle or any other relatively random shape can be effective if the factors referred to have been taken sufficiently into account.

As the compartments do not have any elements extending radially inwardly, there is a great degree of uniformity in the way in which the pellets are carried upwards along the drum wall and roll down over one another, and all pellets are subjected to practically the same treatment, so that all pellets are coated uniformly in an equal manner.

In order for these effects to be obtained, it is preferred that the drum is divided into a sufficient number of compartments. For most purposes 4–6 compartments have been found to be effective.

In practice, excellent results have been obtained with a continuously operating coating drum designed and constructed in accordance with the present invention, and having a capacity of approximately 1200 ton pellets per day, a length of 10 m and a diameter of 2 mm, which drum was fitted with 5 interior partitions equidistantly spaced from one another and containing eccentric round passage openings having a diameter of 900 mm. In each pair of directly succeeding partitions, these passage openings were peripherally offset through 180°. The drum had a discharge opening of 900 mm, was disposed at an angle of inclination of some degrees and was rotated at a rate of 6 rpm. The layer of pellets in the drum was 500 mm high. In the first compartment adjacent to the supply end of the drum, the liquid coating agent was sprayed on the pellets to be coated through two sprayers, and in the other five compartments the coating agent was spread over the surface of the pellets.

We claim:

1. An apparatus for coating pellets, such as prills, granules and the like, with a liquid coating agent, which comprises a cylindrical, obliquely disposed drum arranged for rotation about its longitudinal axis, said drum comprising means at or adjacent its higher end for the supply and input of pellets to be coated and for supplying and spraying or atomizing said liquid coating agent over the pellets introduced, and means at or adjacent its lower end for the output and discharge of coated product pellets, said apparatus being characterized by partitions arranged transversely to the axis of rotation and dividing the drum into compartments, each of said partitions having a passage opening located eccentrically relative to the axis of rotation and so that the passage openings in each pair of partitions defining a compartment are peripherally offset relatively to each other.

2. Apparatus according to claim 1, wherein the passage openings in the partitions are formed so as to adjoin the inner wall of the drum.

3. Apparatus according to claim 1, wherein the passage openings in each pair of directly succeeding partitions are peripherally offset through approximately 180°.

4. Apparatus according to claim 1, wherein each passage opening has a width in the radial direction relative to the axis of rotation which is less than half the interior diameter of the drum.

5. Apparatus according to claim 1, wherein all passage openings have substantially equal surface area, which surface area is more than 2% but less than 25%, of the cross-sectional area of the drum.

6. Apparatus according to claim 1, wherein the perpendicular distance between two directly succeeding partitions does not exceed the interior diameter of the drum.

* * * * *